April 23, 1940.
G. E. WYNN ET AL
2,198,325
APPARATUS FOR AND METHOD OF SELECTING FRACTIONS
FROM FRACTIONATING CONDENSERS
Filed June 16, 1939
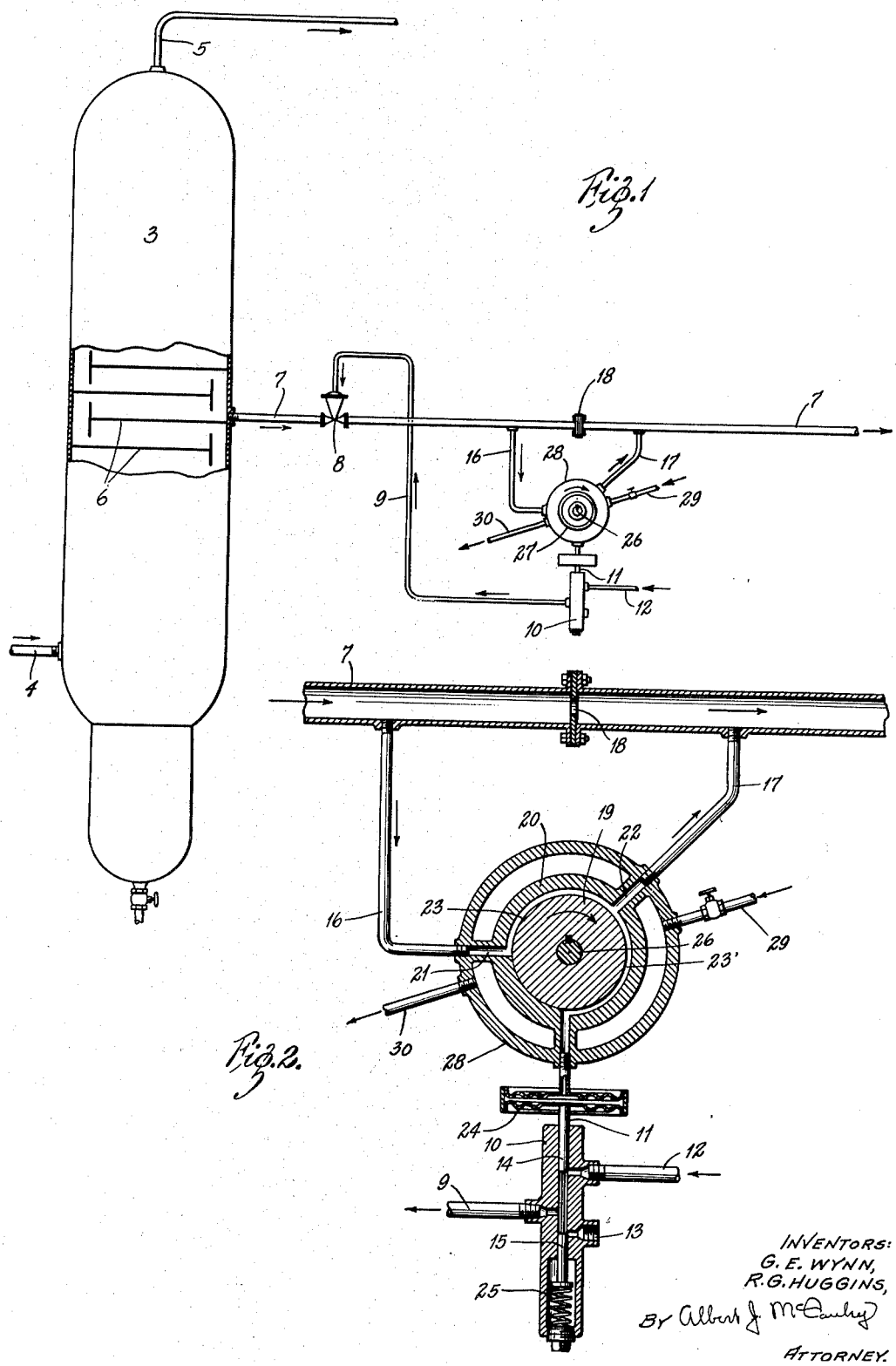
INVENTORS:
G. E. WYNN,
R. G. HUGGINS,
By Albert J. McCauley
ATTORNEY.

Patented Apr. 23, 1940

2,198,325

UNITED STATES PATENT OFFICE 2,198,325

APPARATUS FOR AND METHOD OF SELECTING FRACTIONS FROM FRACTIONATING CONDENSERS

Glenn E. Wynn and Robert G. Huggins, Tulsa, Okla., assignors to Mid-Continent Petroleum Corporation, Tulsa, Okla., a corporation of Delaware Application June 16, 1939, Serial No. 279,484

12 Claims. (Cl. 202—40)

This invention relates to apparatus for and methods of selecting fractions from fractionating condensers, the object being to overcome the uncertainty and inaccuracy heretofore involved in obtaining a condensed product having a predetermined viscosity.

Prior to this invention, fractionating condensers, or reflux condensers, have been rather extensively employed to condense and discharge various different products, and the cooling in such condensers has been regulated as an aid in selecting the desired products. This is especially true of the petroleum industry, wherein products having different boiling points are condensed and removed from different cooling zones in the fractionating condensers. In commercial practice, automatic regulating devices are commonly employed to control the condensing temperatures, thereby providing for the selection and removal of fractions which are condensed at a predetermined temperature.

However, a selection of this kind, depending upon a predetermined condensing temperature, does not result in the recovery of a product having predetermined properties. Even if we assume that a constant temperature is accurately maintained in a given condensing zone, the condensate removed from that zone will vary in accordance with varying conditions which inevitably occur in actual practice. For example, the operating pressure in the condenser is subject to more or less frequent variations, and this variation in pressure will obviously result in in variations in the product condensed at a predetermined constant temperature. Other variations in the condensed product are due to variations in the character of the charging material, variations in the charging rates and changes in the partial pressures of the vapors, all of which are beyond the control of a device which merely maintains a constant temperature in the selected condensing zone.

Nevertheless, in commercial practice, the ordinary method of selecting a condensed fraction from a fractionating condenser consists in the use of temperature regulating devices intended to constantly maintain a predetermined temperature in the condensing zone. Such devices are more or less satisfactory when the object is to obtain a fraction having predetermined boiling points, but the constant temperature in the condensing zone results in variations in the boiling points. The same devices are commonly employed to maintain a constant condensing temperature when the object is to obtain a product having a predetermined viscosity. It will be apparent, however, that the boiling points, or condensing points, are not a true guide to the viscosity of the product, and that the inevitable variations in the operating conditions are additional factors tending to vary the viscosity of a product condensed at a predetermined constant temperature.

To obtain a condensed product having a predetermined viscosity, we depart from the usual idea of maintaining a constant or uniform condensing temperature. Instead of adhering to this rule, we deliberately vary the condensing temperatures, and thereby compensate for, or overcome, the effects of the usual variations due to inevitable changes in the operating conditions. Regardless of such inevitable changes, we constantly select and discharge a stream of condensate having the predetermined viscosity.

With the foregoing and other objects in view, the invention comprises the novel method, construction, combination and arrangement of parts hereinafter more specifically described and shown in the accompanying drawing, which illustrates one form of the invention. However, it is to be understood that the invention comprehends changes, variations and modifications within the scope of the claims hereunto appended.

Briefly stated, the vapors in the fractionating condenser are subjected to variable cooling so as to condense selected portions of the vapors, and a stream of the resultant condensate is transmitted to a controlling device movable in response to variations in the viscosity of the stream. Movement is transmitted from this device to the variable cooling device, so as to regulate the cooling in accordance with the viscosity of the condensate. Instead of maintaining a constant, or uniform, condensing temperature, the cooling device is regulated to deliberately change this temperature, and as a consequence, the condensed product has a predetermined viscosity. The temperature changes in the condenser compensate for the above-mentioned inevitable variations in the operating conditions, and such changes in the condensing temperature will occur whenever the stream of condensate departs from the predetermined viscosity, thereby adjusting the cooling device to maintain said viscosity, regardless of other variations in the system.

Fig. 1 is a diagrammatical illustration of an apparatus embodying features of this invention.

Fig. 2 is an enlarged section showing a controlling device, and a regulating valve associated therewith.

To illustrate one form of the invention, we have shown a reflux fractionating condenser 3 provided with a vapor inlet 4 near the bottom and a vapor outlet 5 at the top. It will be understood that the vapors entering at 4 may be generated in any suitable manner, and the vapors discharged through the outlet 5 may be condensed in any desired condenser. The fractionating condenser 3 may be of the bubbling type, including a series of bubble decks 6 arranged to form a series of pools through which the vapors are bubbled and subjected to partial condensation as they progress through the condenser.

The rate and degree of cooling and condensing may be controlled in any suitable manner. For example, a selected stream of condensate may be discharged through a pipe 7, and the flow through this pipe may be regulated, or any other suitable means may be employed to regulate the cooling in the fractionating condenser. However, the regulating means is adjusted in accordance with the viscosity of the condensate, thereby varying the temperatures in the selected condensing zone, instead of maintaining a uniform temperature condition.

Fig. 1 illustrates a suitable regulating means wherein an air-actuated valve 8 in the discharge pipe 7 is adjusted to vary the flow of condensate through said discharge pipe. It is to be understood that this condensate is cooler than the vapors in the lower portion of the condenser, and that the valve 8 can be regulated to discharge any desired quantity of the reflux condensate, thereby regulating the delivery of relatively cool condensate to the lower portion of the condenser. In this manner, the cooling and condensing in the condenser can be regulated to provide for the discharge of a predetermined fraction through the valve 8. For example, if the discharged fraction is too viscous, the valve 8 may be adjusted to reduce the discharge of condensate, thereby permitting more of the condensate to overflow into the relatively hot lower zone, so as to condense more of the high boiling point fractions and prevent them from rising to the plane of the discharge pipe 7.

An air pipe 9 connects said air-actuated valve 8 to a housing 10 containing a slidable valve 11 and having an inlet pipe 12 for compressed air, and a port 13 through which the air is exhausted. The slidable valve 11 comprises a pair of valve members 14 and 15 arranged as shown in Fig. 2 to control the air pressure in the pipe 9 leading to the valve 8. It will be understood that a device of this kind may be employed to regulate the valve 8 in the discharge pipe 7, thereby regulating the cooling in the selected zone of the fractionating condenser.

To illustrate a suitable means for adjusting the regulating valve 11, we have shown a testing device which may be termed a viscometer arranged to receive a continuous stream of condensate which flows through a by-pass including a pipe 16 leading from the discharge pipe 7, and a pipe 17 returning to said discharge pipe 7. An orifice plate 18 may be located in the pipe 7 at a point between the pipes 16 and 17, so as to provide a pressure differential at opposite sides of said orifice plate.

The viscometer includes a movable member 19 and a relatively stationary member 20, said stationary member having inlet and outlet ports 21 and 22 for the stream to be tested, and an arcuate passageway 23 connecting said ports. This passageway is formed in the stationary member 20 and it extends beyond the outlet port 22, as shown in Fig. 2. The extended portion 23' of said passageway leads to a suitable pressure-responsive device, which may include a diaphragm 24 movable in response to variations in the pressure of the fluid contacting therewith. The diaphragm 24 engages the upper end of the valve 11, while a spring 25 in the housing 10 tends to impart upward movement of the valve.

It will now be understood that variations in the pressure on the diaphragm will result in corresponding movements of the regulating valve 11, thereby adjusting the air-actuated valve 8 in the discharge pipe 7, so as to increase or decrease the discharge of condensate in response to said variations in pressure.

The movable member 19 of the testing device may be operated in any suitable manner. For example, it may be fixed to a shaft 26 provided with a driving wheel 27, rotated at a constant speed in the direction indicated by an arrow in Fig. 2. The stream of condensate in the passageway 23 contacts with the rotating member 19 and also with the surrounding stationary member 20. This results in internal friction in the condensate and the stream is divided at the outlet port 22. The outer portion of the stream immediately passes through the outlet port, while the inner portion of said stream follows the moving surface of the rotor 19 in the extended portion 23' of the passageway and eventually returns to the outlet port by flowing through the outer portion of the extended passageway. Pressure is thus developed in the extended portion of the passageway, and the degree of pressure is a measure of the viscosity of the condensate. In other words, the pressure at the diaphragm 24 varies in accordance with variations in the viscosity of the condensate. The regulating valve 11 is adjusted in response to movements of the diaphragm so as to regulate the cooling in the fractionating condenser.

It will be observed that the selected condensate is constantly undergoing the test of the viscosity-responsive testing device, and that energy is constantly transmitted from said testing device to the regulating means, so as to either maintain the air valve 11 in a fixed position, or to immediately shift said valve when there is a slight departure from the predetermined viscosity.

The pressure-responsive diaphragm 24 moves in response to variations in the viscosity of the condensate stream, but the viscosity indicated by the test will depend partly upon the temperature of the condensate. Any suitable means may be employed to compensate for variations in the temperature of the stream discharged from the condenser, and if desired, the stream to be tested may be either heated or cooled to a predetermined temperature. To illustrate a device of this kind, we have shown a heat exchanger comprising a jacket 28 surrounding the stationary member 20 and provided with inlet and discharge pipes 29 and 30 through which a stream of heating or cooling fluid is transmitted. The flow of this fluid can be regulated to maintain an approximately constant predetermined temperature in the portion of the condensate stream flowing through the testing device.

We claim:

1. In an apparatus for selecting predetermined fractions from a fractionating condenser provided with means for regulating the cooling in the condenser, a testing device for the condensed fraction to be discharged from said condenser, said testing device including a member movable in response to variations in the viscosity of said condensed fraction, and means for transmitting movement from said movable member to said regulating means, so as to adjust said regulating means in accordance with said variations in viscosity.

2. In an apparatus for selecting predetermined fractions from a fractionating condenser provided with means for regulating the cooling in the condenser, a viscometer through which a stream of the condensate is transmitted, and means for transmitting movement from said viscometer to said regulating means, so as to regulate the cooling in accordance with the viscosity of said stream.

3. In an apparatus for selecting predetermined fractions from a fractionating condenser provided with means for regulating the cooling in the condenser, a viscometer having a passageway through which a continuous stream of the condensate is transmitted and a member movable in response to variations in the viscosity of the stream in said passageway, and means for transmitting movement from said movable member to said regulating means so as to regulate the cooling in accordance with the viscosity of said stream.

4. In an apparatus for selecting predetermined fractions from a fractionating condenser provided with means for regulating the cooling in the condenser, a viscometer having a passageway through which a stream of the condensate is constantly transmitted, a pressure-responsive member movable in response to variations in the viscosity of said constant stream, and means for transmitting movement from said pressure-responsive member to said regulating means, so as to regulate said cooling in accordance with the viscosity of said stream.

5. In an apparatus for selecting predetermined fractions from a fractionating condenser provided with means for regulating the cooling in the condenser, a viscometer having a passageway through which a stream of the condensate is constantly transmitted, a pressure-responsive member movable in response to variations in the temperature and viscosity of said stream, a temperature-compensating device adjusted to maintain said stream at a predetermined temperature, and means for transmitting movement from said pressure-responsive member to said regulating means, so as to regulate said cooling in accordance with the viscosity of said stream.

6. In an apparatus for selecting predetermined fractions from a fractionating condenser provided with means for regulating the cooling in the condenser, a viscometer having a passageway through which a continuous stream of the condensate is transmitted and a member movable in response to variations in the viscosity of the stream in said passageway, a variable heat exchanger adjusted to maintain said stream at a predetermined uniform temperature, and means for transmitting movement from said movable member to said regulating means so as to regulate the cooling in accordance with the viscosity of said stream.

7. In an apparatus for selecting predetermined fractions from a fractionating condenser provided with means for regulating the cooling in the condenser, a viscometer through which a stream of the condensate is transmitted, said viscometer including a pressure-responsive member constantly subjected to the pressure of said stream, and means for constantly transmitting energy from said pressure-responsive member to said regulating means, so as to regulate said cooling in accordance with the pressure developed in said stream.

8. In an apparatus for selecting predetermined fractions from a fractionating condenser provided with means for regulating the cooling in the condenser, a testing device through which a stream of the condensate is transmitted, said testing device including a constantly moving testing member and a relatively stationary testing member, a passageway being formed between said members to receive the stream of condensate, a pressure-responsive member communicating with said passageway so as to move in response to variations in the pressure transmitted from the stream in said passageway, and means for transmitting movement from said pressure-responsive member to said regulating means, so as to regulate said cooling in accordance with the pressure in said passageway.

9. In an apparatus for selecting predetermined fractions from a fractionating condenser provided with means for regulating the cooling in the condenser, a testing device through which a stream of the condensate is transmitted, said testing device including a constantly rotating testing member and a relatively stationary testing member, a passageway being formed between said members to receive the stream of condensate, a temperature-compensating device adjusted to maintain said stream at an approximately uniform temperature, a pressure-responsive member communicating with said passageway so as to move in response to variations in the pressure transmitted from said passageway, and means for transmitting movement from said pressure-responsive member to said regulating means, so as to regulate said cooling in accordance with the pressure in said passageway.

10. In an apparatus for selecting predetermined fractions from a fractionating condenser provided with means for regulating the cooling in the condenser, a conductor through which a continuous stream of condensate is discharged from the condenser, a by-pass extending from and returning to said conductor, a stator arranged in said by-pass to receive and discharge the sample of condensate transmitted through the by-pass, a rotor surrounded by and contacting with said stator, said rotor having an operating member driven at a constant speed, said stator having inlet and outlet ports for the sample and a passageway connecting said ports, said passageway being formed between the rotor and stator and extended beyond said outlet port, a pressure-responsive member communicating with the extended portion of said passageway, so as to move in response to variations in the pressure of the condensate in said passageway, and means for transmitting movement from said pressure-responsive member to said regulating means so as to regulate said cooling in accordance with the pressure in the extended portion of said passageway.

11. In the art of selecting predetermined fractions from fractionating condensers, the method of selecting a fraction having a predetermined viscosity which comprises subjecting the vapors in the condenser to variable cooling so as to condense selected portions of the vapors, discharging a continuous stream of condensate from the condenser, constantly testing said continuous stream to ascertain the viscosity thereof while it is flowing from the condenser, and constantly transmitting energy from the testing means to the variable cooling means, so as to regulate the cooling in accordance with the viscosity of said continuous stream.

12. In the art of selecting predetermined fractions from fractionating condensers, the method of selecting a fraction having a predetermined viscosity which comprises subjecting the vapors in the condenser to variable cooling so as to condense selected portions of the vapors, discharging a continuous stream of condensate from the condenser, selecting a portion of said continuous stream, maintaining said selected portion at a substantially constant predetermined temperature while subjecting it to varying degrees of pressure depending upon the viscosity of said selected portion of the stream, and constantly transmitting the pressure of said selected portion of the stream to the variable cooling means, so as to regulate the cooling in accordance with said varying degrees of pressure.

GLENN E. WYNN.
ROBERT G. HUGGINS.